(12) United States Patent
Skalecki

(10) Patent No.: US 11,356,354 B2
(45) Date of Patent: Jun. 7, 2022

(54) CONGRUENT BIDIRECTIONAL SEGMENT ROUTING TUNNELS

(71) Applicant: Ciena Corporation, Hanover, MD (US)

(72) Inventor: Darek Skalecki, Ottawa (CA)

(73) Assignee: Ciena Corporation, Hanover, MD (US)

( * ) Notice: Subject to any disclaimer, the term of this patent is extended or adjusted under 35 U.S.C. 154(b) by 18 days.

(21) Appl. No.: 16/854,169

(22) Filed: Apr. 21, 2020

(65) Prior Publication Data

US 2021/0328905 A1    Oct. 21, 2021

(51) Int. Cl.
| | |
|---|---|
| H04L 45/02 | (2022.01) |
| H04L 12/46 | (2006.01) |
| H04L 45/00 | (2022.01) |
| H04L 45/021 | (2022.01) |
| H04L 45/12 | (2022.01) |
| H04L 45/121 | (2022.01) |

(52) U.S. Cl.
CPC .......... *H04L 45/02* (2013.01); *H04L 12/4633* (2013.01); *H04L 45/00* (2013.01); *H04L 45/021* (2013.01); *H04L 45/10* (2013.01); *H04L 45/12* (2013.01); *H04L 45/121* (2013.01); *H04L 45/123* (2013.01)

(58) Field of Classification Search
CPC ..... H04L 12/4633; H04L 45/00; H04L 45/02; H04L 45/10; H04L 45/12; H04L 45/021; H04L 45/121; H04L 45/123
See application file for complete search history.

(56) References Cited

U.S. PATENT DOCUMENTS

| | | | |
|---|---|---|---|
| 8,571,029 B1 * | 10/2013 | Aggarwal | ............... H04L 45/50 370/390 |
| 10,069,639 B2 | 9/2018 | Bragg et al. | |

(Continued)

FOREIGN PATENT DOCUMENTS

EP    3 629 530 A1    4/2020

OTHER PUBLICATIONS

Previdi et al., IPv6 Segment Routing Header (SRH) draft-previdi-6man-segment-routing-header-08, Network Working Group, Standards Track, Oct. 2, 2015, pp. 1-30.

(Continued)

*Primary Examiner* — Melanie Jagannathan
(74) *Attorney, Agent, or Firm* — Clements Bernard Baratta; Lawrence A. Baratta, Jr.; Christopher L. Bernard

(57) ABSTRACT

Systems and methods provide congruent bidirectional Segment Routing (SR) tunnels, namely congruent and fate-shared traffic forwarding for bidirectional SR tunnels. A bidirectional SR tunnel, as described herein, includes two unidirectional SR tunnels where the forward and reverse traffic directions follow the same path through the network when forwarded based on prefix and adjacency Segment Identifiers (SIDs). The term "congruent" is used herein to refer to the fact that the two unidirectional SR tunnels, i.e., the forward and reverse traffic directions, follow the same path through the network but in opposite directions. The guarantee of congruency is based on modification of the Segment Identifier (SID) configuration at the source nodes of each tunnel. Accordingly, the present disclosure maintains compatibility with existing Segment Routing configurations with the modifications solely at the source nodes.

17 Claims, 17 Drawing Sheets

(56) References Cited

U.S. PATENT DOCUMENTS

| | | |
|---|---|---|
| 10,153,948 B2 | 12/2018 | Ong |
| 2009/0279536 A1* | 11/2009 | Unbehagen .............. H04L 45/00 370/352 |
| 2013/0034103 A1* | 2/2013 | Chen ....................... H04L 45/04 370/400 |
| 2014/0286344 A1 | 9/2014 | Skalecki et al. |
| 2015/0195178 A1* | 7/2015 | Bhattacharya ........ H04L 45/745 718/1 |
| 2015/0288602 A1 | 10/2015 | Bragg et al. |
| 2016/0043934 A1* | 2/2016 | Ubaldi .................... H04L 45/02 370/390 |
| 2016/0380886 A1 | 12/2016 | Blair et al. |
| 2017/0093718 A1* | 3/2017 | Lin ......................... H04L 45/12 |
| 2017/0317953 A1 | 11/2017 | Sareen et al. |
| 2018/0013613 A1 | 1/2018 | Skalecki et al. |
| 2018/0198706 A1* | 7/2018 | Ceccarelli ............... H04L 45/50 |
| 2019/0166045 A1* | 5/2019 | Peng ....................... H04L 45/48 |
| 2019/0190818 A1* | 6/2019 | Ceccarelli ............... H04L 45/56 |
| 2019/0245787 A1 | 8/2019 | Skalecki et al. |
| 2019/0356600 A1* | 11/2019 | Barton ...................... H04B 7/14 |
| 2020/0127913 A1* | 4/2020 | Filsfils .................... H04L 45/52 |
| 2020/0204479 A1* | 6/2020 | Filsfils .................... H04L 45/74 |
| 2020/0287824 A1* | 9/2020 | Dutta ...................... H04L 45/22 |
| 2020/0322264 A1* | 10/2020 | Clad ....................... H04L 63/20 |
| 2020/0351193 A1* | 11/2020 | Mao ...................... H04L 45/123 |
| 2021/0176169 A1* | 6/2021 | Chen ....................... H04L 45/34 |
| 2021/0399979 A1* | 12/2021 | Sikhivahan ........... H04L 45/122 |

OTHER PUBLICATIONS

Filsfils et al., Segment Routing Architecture, Internet Engineering Task Force (IETF), Standards Track, ISSN: 2070-1721, Jul. 2018, pp. 1-32.

Xiong et al., "PCEP extensions for SR MPLS-TP," PCE WG, Internet-Draft, Standards Track, Internet Engineering Task Force (IETF), Oct. 22, 2018, pp. 1-10.

Sep. 15, 2021, European Search Report for European Patent Application No. EP 21 16 8212.

* cited by examiner

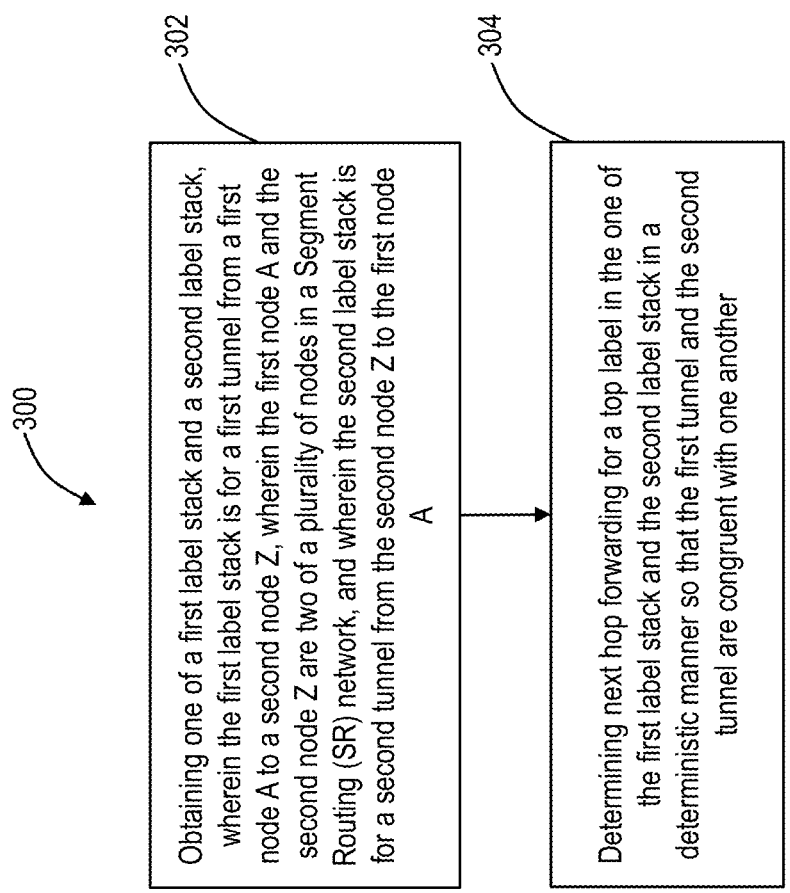

CONGRUENT BIDIRECTIONAL SEGMENT ROUTING TUNNELS

FIELD OF THE DISCLOSURE

The present disclosure generally relates to Segment Routing (SR) networking. More particularly, the present disclosure relates to systems and methods for congruent bidirectional SR tunnels.

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header— for example, the document published in July 2015 as draft-previdi-6man-segment-routing-header (available online at tools.ietforg/html/draft-previdi-6man-segment-routing-header-08). A segment is encoded as an IPv6 address. An ordered list of segments is encoded as an ordered list of IPv6 addresses in the routing extension header. The segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

Segment Routing tunnels are naturally unidirectional in the conventional implementation, that is, communication between nodes A and Z is via two unidirectional tunnels that may have different paths from A to Z as from Z to A. That is, there is no guarantee of congruency between two unidirectional tunnels. This is described, e.g., in Li et al., "PCEP Extensions for Associated Bidirectional Segment Routing (SR) Paths," draft-li-pce-sr-bidir-path-06, Aug. 19, 2019, PCE Working Group, the contents of which are incorporated herein by reference. As described herein, congruency in a network sense means two tunnels or services take the same path in the network, particularly in the case of two unidirectional tunnels where a tunnel from A to Z takes the same path as from Z to A. Taking same path means following the same set of nodes and links, albeit in opposite directions.

There is a need for bidirectional tunnels for many services, such as mobile backhaul. Specifically, the lack of congruency can lead to propagation delay, latency, tunnel faults (where one tunnel is impacted, but not the other), etc. For example, real-time communication, such as voice, video, etc., is difficult when a delay from A to Z is different than from Z to A because non-congruent paths are used for both directions.

BRIEF SUMMARY OF THE DISCLOSURE

The present disclosure relates to systems and methods for congruent bidirectional SR tunnels, namely congruent and fate-shared traffic forwarding for bidirectional SR tunnels. A bidirectional SR tunnel, as described herein, includes two unidirectional SR tunnels where the forward and reverse traffic directions follow the same path through the network when forwarded based on prefix and adjacency Segment Identifiers (SIDs). The term "congruent" is used herein to refer to the fact that the two unidirectional SR tunnels, i.e., the forward and reverse traffic directions, follow the same path through the network, i.e., follow the same sequence of nodes and links but in opposite directions. That is, congruency is used in the geometric sense. The guarantee of congruency is based on a modification of the SID configuration at the source nodes of each tunnel. Accordingly, the present disclosure maintains compatibility with existing Segment Routing configurations with the modifications solely at the source nodes.

In an embodiment, a non-transitory computer-readable medium includes instructions stored thereon for programming a device to perform steps. In another embodiment, a method is described to perform the steps. In a further embodiment, an apparatus includes a processor and memory storing instructions that, when executed, cause the processor to perform the steps. The steps include obtaining one of a first label stack and a second label stack, wherein the first label stack is for a first tunnel from a first node A to a second node Z, wherein the first node A and the second node Z are two of a plurality of nodes in a Segment Routing (SR) network, and wherein the second label stack is for a second tunnel from the second node Z to the first node A; and determining next hop forwarding for a top label in the one of the first label stack and the second label stack in a deterministic manner so that the first tunnel and the second tunnel are congruent with one another.

The first tunnel and the second tunnel are each a unidirectional SR tunnel, but are guaranteed to be congruent based on the deterministic manner, thereby collectively operating as a bidirectional SR tunnel. The first label stack and the second label stack can each include one or more of prefix Segment Identifiers (SIDs) and adjacency SIDs. The second label stack can be determined based on inverting the first label stack. The deterministic manner can include the determination of next hop forwarding from a same perspective between a master node and a slave node in the second tunnel as in the first tunnel, where the same perspective guarantees each of the plurality of nodes calculates a shortest path in a same manner. The deterministic manner can include a recursive selection of one shortest path from a plurality of equal cost shortest paths. The first label stack and the second label stack can each include a prefix Segment Identifier (SID) that is defined as a congruency SID to denote a bidirectional congruent traffic flow.

BRIEF DESCRIPTION OF THE DRAWINGS

The present disclosure is illustrated and described herein with reference to the various drawings, in which like reference numbers are used to denote like system components/method steps, as appropriate, and in which:

FIG. 20 is a flowchart of a process for determining congruent bidirectional tunnels in SR.

DETAILED DESCRIPTION OF THE DISCLOSURE

Figure 1:
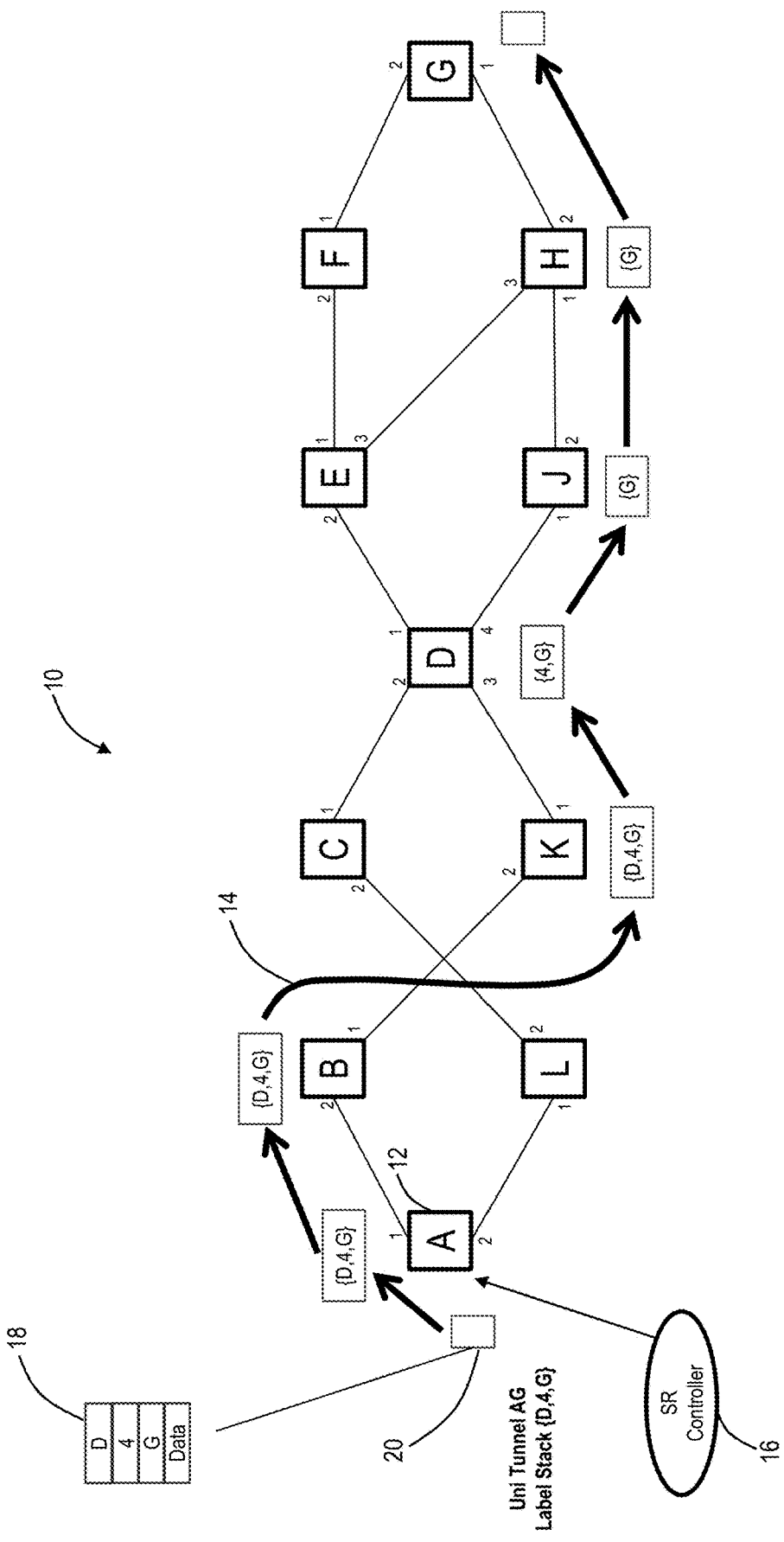
FIG. 1 is a network diagram of an example Segment Routing (SR) network with a plurality of nodes (labeled as A-G) for illustrating operation of an SR tunnel.

The present disclosure relates to systems and methods for congruent bidirectional SR tunnels, namely congruent and fate-shared traffic forwarding for bidirectional SR tunnels. A bidirectional SR tunnel, as described herein, includes two unidirectional SR tunnels where the forward and reverse traffic directions follow the same path through the network when forwarded based on prefix and adjacency Segment Identifiers (SIDs). The term "congruent" is used herein to refer to the fact that the two unidirectional SR tunnels, i.e., the forward and reverse traffic directions, follow the same path through the network, i.e., follow the same sequence of nodes and links but in opposite directions. The guarantee of congruency is based on a modification of the SID configuration at the source nodes of each tunnel. Accordingly, the present disclosure maintains compatibility with existing Segment Routing configurations with the modifications solely at the source nodes. Advantageously, the present disclosure enables bidirectional SR tunnels having the same paths which is required for various applications such as mobile backhaul, e.g., a live service between two people A and Z may become awkward when delay from A to Z is different than from Z to A because non-congruent paths are used.

The present disclosure utilizes the existing prefix and adjacency Segment Identifiers (SIDs). The approach described herein utilizes two unidirectional SR tunnels with a common path determination so that these two unidirectional SR tunnels are collectively a congruent bidirectional SR tunnel. Operationally, the congruent bidirectional SR tunnel is two unidirectional SR tunnels, but they are guaranteed to share the same (congruent) path based on modifications described herein in the path selection, next hop forwarding determination, etc. The present disclosure builds on the traditional Interior Gateway Protocol (IGP) (e.g., Intermediate System-Intermediate System (ISIS), Open Shortest Path First (OSPF), etc.) Shortest Path First (SPF) calculation of Shortest Path Tree (SPT), and extends it to perform a next hop forwarding determination based on master/slave logic and a recursive ECMP path selection. The master/slave logic determines a perspective from which the calculation is performed, so the forward path computation looks similar to the reverse path computation. The recursive ECMP path selection utilizes an approach to select the same path amongst a set of ECMP paths, for both the forward path and the reverse path. Collectively, the master/slave logic and a recursive ECMP path selection permits both Label Edge Routers (LER) (e.g., A and Z) as well as intermediate Label Switch Routers (LSRs) to pick the same shortest path from among multiple ECMP paths and to program forwarding accordingly at the LERs and at LSRs to guarantee that traffic from A to Z and Z to A follows the same path through the network, i.e., follow the same sequence of nodes and links but in opposite directions.

Segment Routing Overview

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each segment is represented by a Segment Identifier (SID).

All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by ISIS or OSPF. The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A headend node of the SR policy binds a binding SID to its policy. When the headend node receives a packet with an active segment matching the binding SID of a local SR Policy, the headend node steers the packet into the associated SR Policy. The binding SID provides greater scalability, network opacity, and service independence. Instantiation of the SR Policy may involve a list of SIDS. Any packets received with an active segment equal to binding SID are steered onto the bound SR Policy. The use of a binding SID allows the instantiation of the policy (the SID list) to be stored only on the node or nodes that need to impose the policy. The direction of traffic to a node supporting the policy then only requires the imposition of the binding SID. If the policy changes, this also means that only the nodes imposing the policy need to be updated. Users of the policy are not impacted. The binding SID can be allocated from the local or global domain. It is of special significance at the headend node where the policy is programmed in forwarding.

An anycast segment is a type of prefix segment that represents an anycast group and is advertised with its P-Flag (no PHP) bit set for ISIS, NP-Flag for OSPFv2, and for OSPFv3 set prefix SID sub-Type-Length-Value (TLV) bit to 1 and E-Flag to 0. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group.

SR Tunnels

Figure 18:
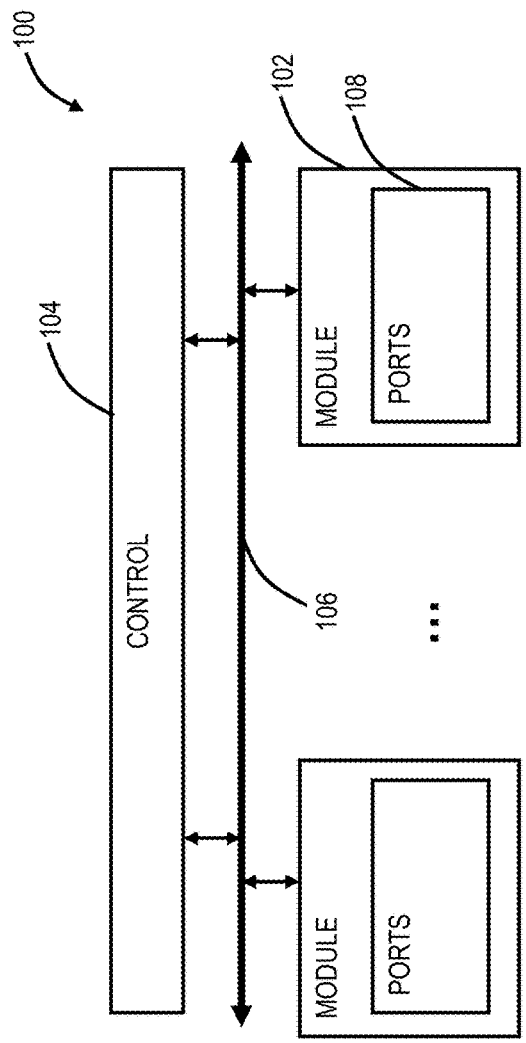
FIG. 18 is a block diagram of an example implementation of a node, such as for the node in the various SR networks described herein.

FIG. 1 is a network diagram of an example Segment Routing (SR) network 10 with a plurality of nodes 12 (labeled as A-G) for illustrating operation of a SR tunnel 14. The nodes 12 can be switches, routers, Packet-Optical Transport Systems (POTS), etc. An example implementation of the nodes 12 is illustrated in FIG. 18. In this example, for illustration purposes, the network 10 includes the SR tunnel 14 between the node 12A and the node 12G. SR tunnels, such as the SR tunnel 14, are naturally unidirectional. The SR tunnel 14 can be determined by an SR controller 16. SR can be utilized with a controller-based Software Defined Networking (SDN) architecture. The SDN controller can have a view of the network topology and flows. A node 12 can request a path to a destination with certain characteristics, for example, delay, bandwidth, diversity, etc. The SR controller 16 can determine a path and returns the corresponding segment list, such as an MPLS label stack 18, to the requesting node 12A, for inclusion on a packet 20. At that point, the node 12A can inject traffic with the segment list without any additional signaling in the network 10.

The label stack 18 includes SIDs, e.g., prefix and/or adjacency SIDs. As described herein, the terminology {X, Y, Z} is used to refer to a label stack 18 with topmost label X, middle label Y and bottom label Z, etc., and X, Y, Z may be prefix or adjacency SID. For illustration purposes, in the document, letters (A, B, etc.) denote prefix SIDs, and numbers (1, 2, etc.) denote Adjacency SIDs.

In this example, the SR controller 16 has determined the path from the nodes 12A, 12G as defined by a label stack 18 {D, 4, G}. The SR tunnel 14 is routed with the prefix SID D from the node 12A to the node 12D, via the nodes 12B, 12K. At the node 12D, the adjacency SID 4 causes the routing out port 4 (note, FIG. 1 includes port numbering at the nodes 12, e.g., 1, 2, 3, 4, and a prefix SID 4 means the node 12D forwards the packet 20 via port 4), with a destination of node 12G as noted by the prefix SID G, which causes the tunnel 14 to route via the nodes 12J, 12H. Also, in MPLS terminology, the nodes 12A, 12G are referred to as Label Edge Routers (LERs), and the intermediate nodes are referred to as Label Switch Routers (LSRs).

As already discussed, to enable bidirectionality, i.e., a corresponding SR tunnel from the node 12G to the node 12A that has the same path as the SR tunnel 14, there is no known practical way to define SR Tunnel's reverse path such that it is congruent to the forward path. Today's SR architecture only defines bidirectional SR tunnel as associating two unidirectional SR tunnels, but there is no guarantee of congruency between such two unidirectional SR tunnels.

Problem Statement

Figure 2:
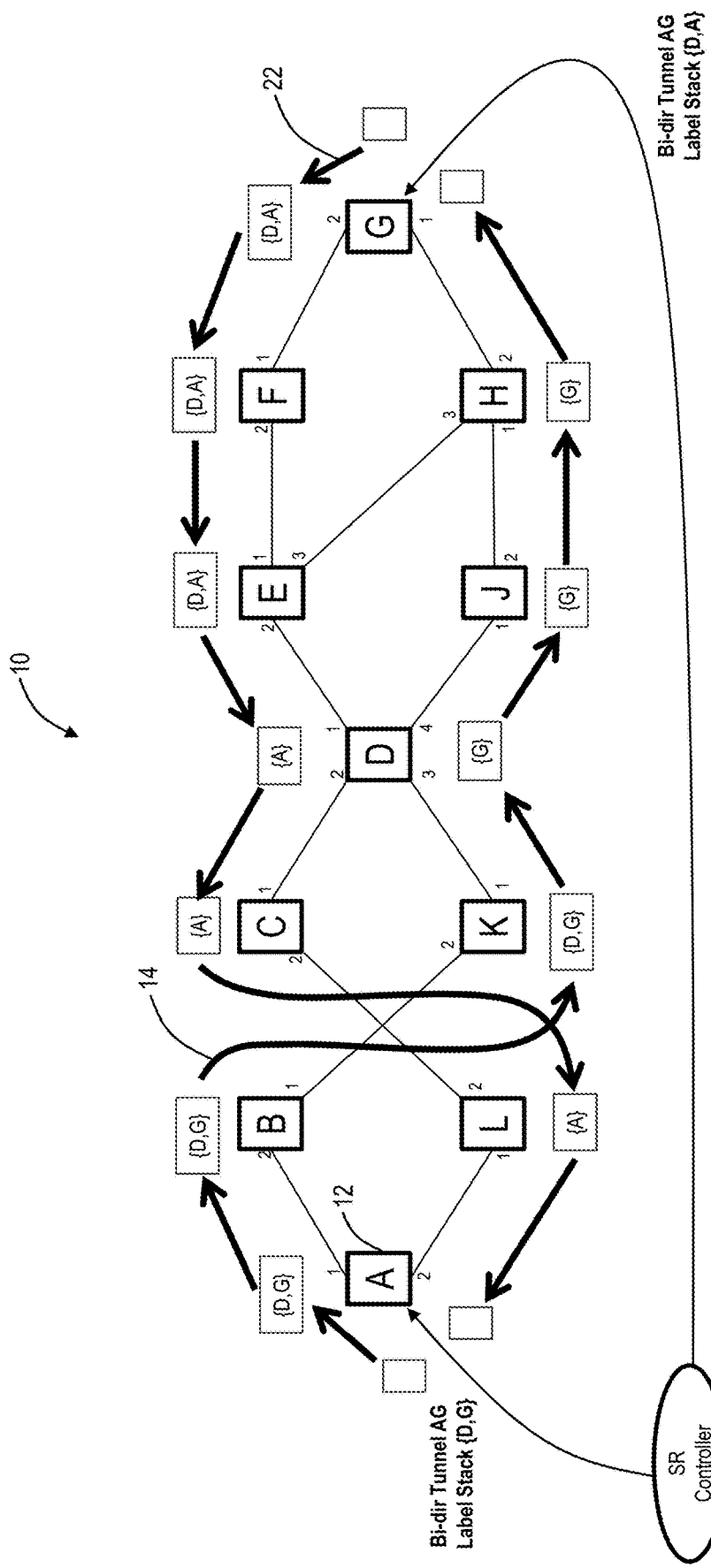
FIG. 2 is a network diagram of the SR network of FIG. 1 illustrating a second SR tunnel where the label stack from the first SR tunnel is simply inverted.
Figure 3:
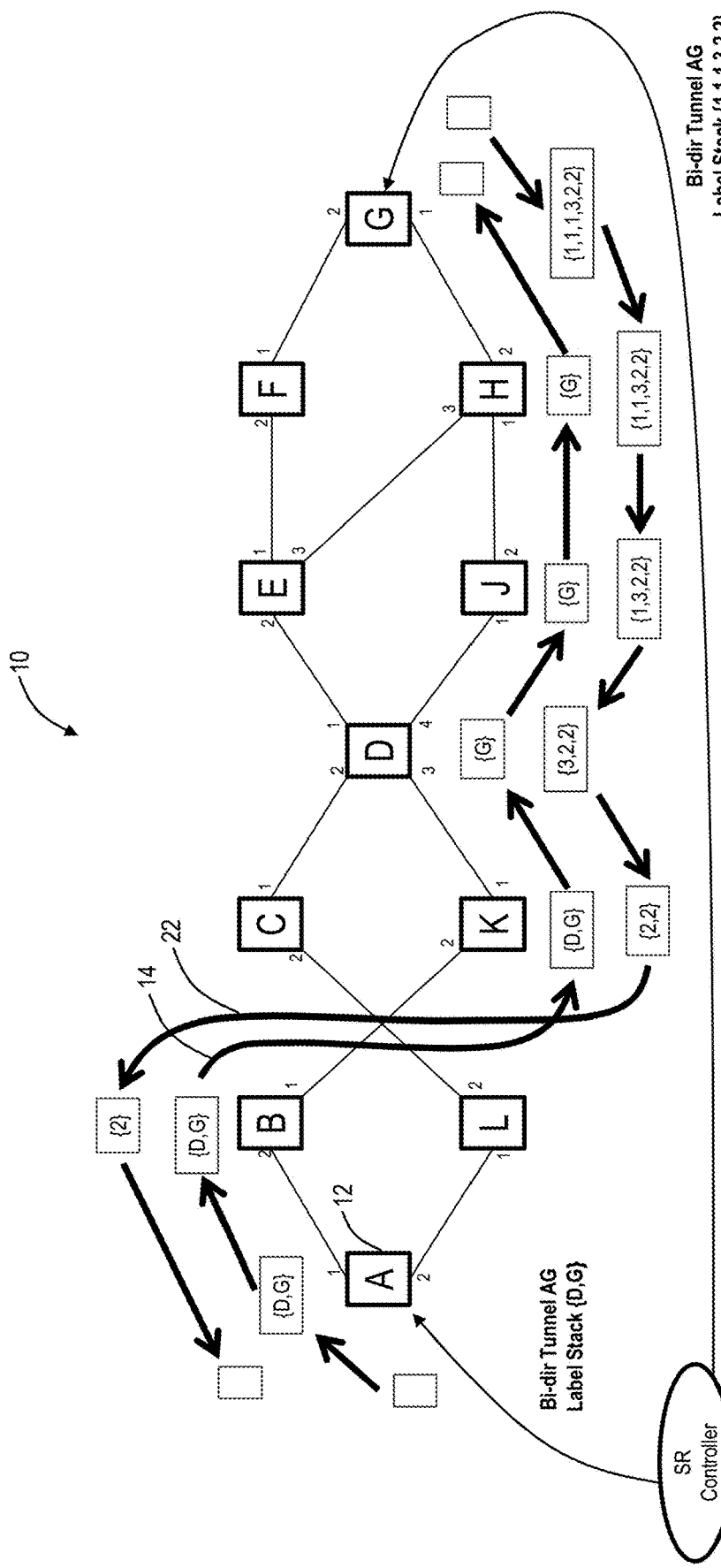
FIG. 3 is a network diagram of the SR network of FIG. 1 illustrating a second SR tunnel where the label stack from the first SR tunnel is represented using Adjacency SIDs derived from the forward path.
Figure 4:
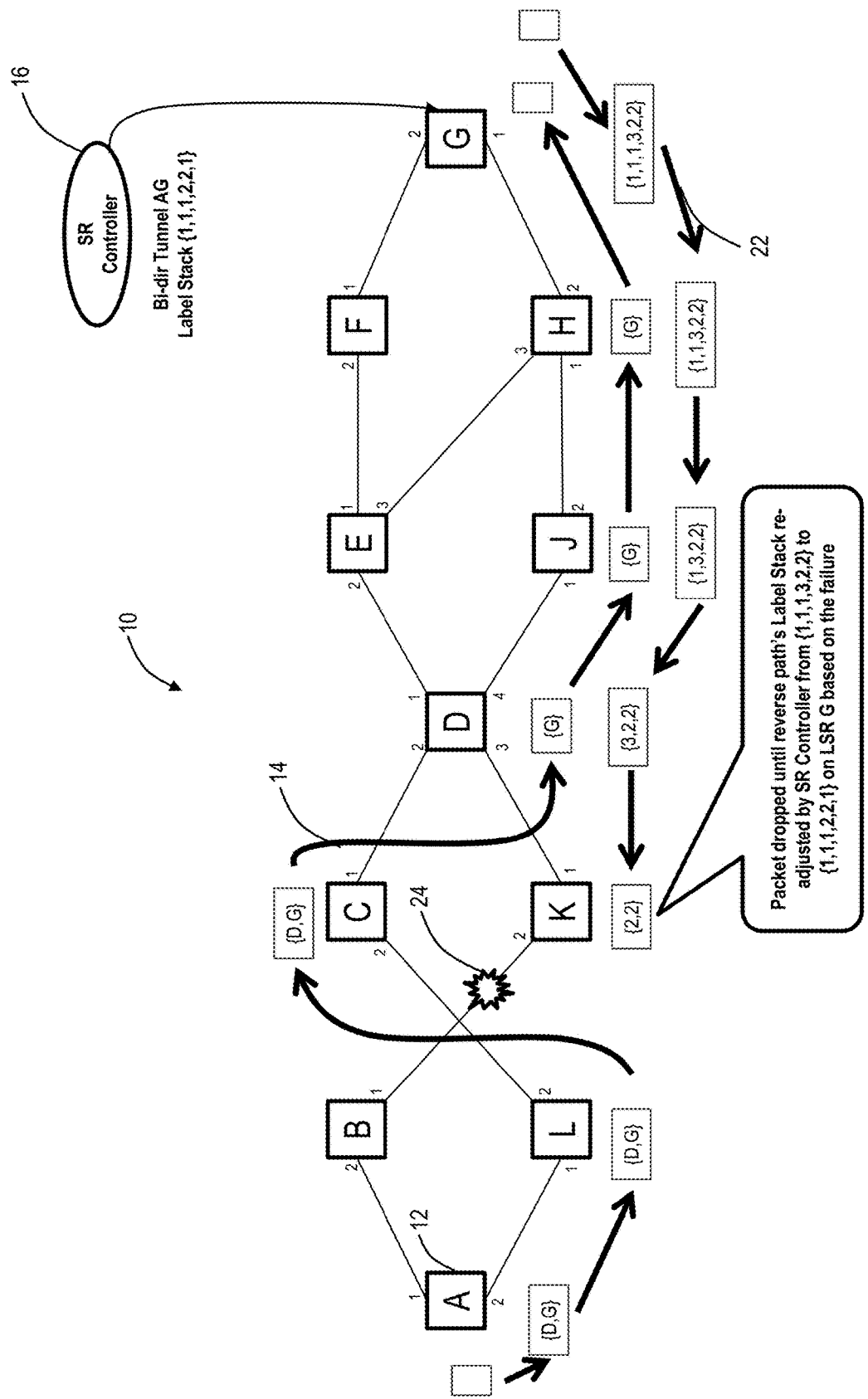
FIG. 4 is a network diagram of the SR network of FIGS. 1 and 3 illustrating the second SR tunnel as in FIG. 3 with a failure between two nodes B, K and the loss of congruency.

For background, FIGS. 2-4 are presented, illustrating two non-working options for bidirectional SR tunnels. FIG. 2 is a network diagram of the SR network 10 illustrating a second SR tunnel 22 where the label stack 18 from the first SR tunnel 14 is simply inverted. Here, the SR tunnel 14 has a label stack of {D, G}, at the node 12A, and the SR tunnel 22 is assigned, by the SR controller 16, an inverted label stack of {D, A}, at the node 12G. As shown in FIG. 2, inverting the forward path's stack cannot guarantee bidirectional congruency because Equal Cost Multi Path (ECMP) causes problems. Specifically, the ECMP problem is when there are multiple best ECMPs (or ECMP paths) that exist between a pair of LSRs, then there is a lack of determinism as to which actual ECMP path is chosen by each of the two LSRs. It is possible that one of the LSRs chooses one ECMP and the other LSR chooses a different ECMP, as is illustrated in FIG. 2, FIG. 3 is a network diagram of the SR network 10 illustrating a second SR tunnel 22 where the label stack 18 from the first SR tunnel 14 is represented using Adjacency SIDs derived from the forward path. This approach actually works, under normal conditions, to provide congruency, but requires the SR tunnel 22 having Adjacency SIDs which define each hop. For example, here, the label stack for the SR tunnel 14 is {D, G}, and the congruent reverse path has a label stack of {1, 1, 1, 3, 2, 2} to define each hop corresponding to the forward path. This is impractical. First, some nodes 12 in implementation have a limit on the label stack depth. Second, a label stack depth of 6 requires 24 bytes, and, for an example 100-byte packet, and this is a 24% tax, i.e., bandwidth inefficient. Third, in the presence of failure, i.e., non-working conditions, this approach cannot guarantee congruency. Specifically, FIG. 4 is a network diagram of the SR network 10, illustrating the second SR tunnel 22 as in FIG. 3 with a failure 24 between two nodes 12B, 12K, and the loss of congruency.

Bidirectional Congruent SR Tunnels

Figure 5:
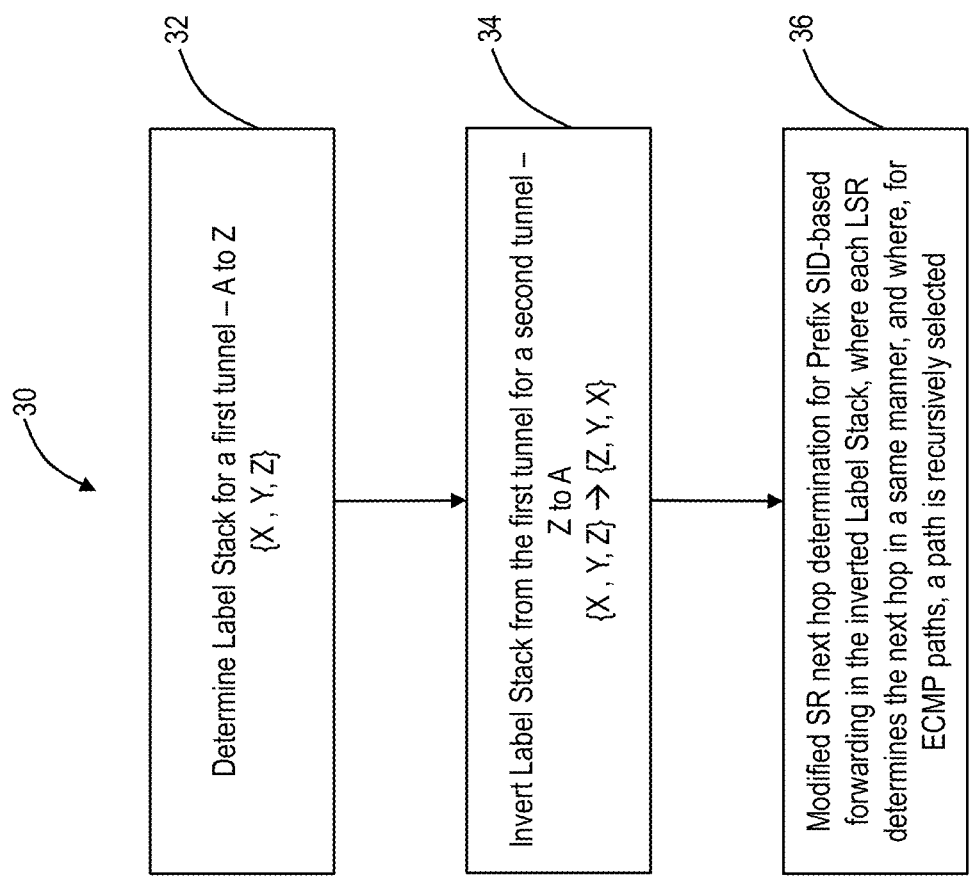
FIG. 5 is a flowchart of a process for determining bidirectional congruent SR tunnels.

FIG. 5 is a flowchart of a process 30 for determining bidirectional congruent SR tunnels. The present disclosure includes a technique that uses an inverted label stack plus a change in ECMP determinations, namely, so both LSRs choose the same ECMP for each tunnel 14, 22, avoiding the problems in FIG. 2. The process 30 can be performed by the SR controller 16 (steps 32 and 34) and all LERs and LSRs (step 36) and is used to ensure the traffic of bi-directional SR tunnels 14, 22 follow the same paths. That is, the SR tunnels 14, 22 are each a unidirectional tunnel, but together the SR tunnels 14, 22 are ensured to have the same paths in the forward and reverse directions, i.e. the paths comprise the same set of nodes and links.

The process 30 includes a determination of a label stack for a first tunnel, i.e., A to Z (step 32). For example, in FIG. 2, the first tunnel can be the SR tunnel 14. For illustration purposes, assume the label stack is {X, Y, Z}. Now, the objective is to find a second tunnel, i.e., Z to A, that has the same path as the first tunnel. The process 30 includes inverting the label stack from the first tunnel for a second tunnel, Z to A (step 34). Again, for illustration purposes, the label stack for the second tunnel is {Z, Y, X}. Up to here, this is as discussed in FIG. 2.

To avoid the problems in FIG. 2 with ECMP, the process 30 includes a modified SR next hop determination for Prefix SID-based forwarding in the inverted label stack (step 36). Here, for each Prefix SID in the inverted label stack, each LSR determines the next hop forwarding from a same perspective. In this manner, the computation in the forward direction is identical to the computation in the reverse direction.

The process 30 requires each LSR in the first and second tunnel compute next hop determination so that congruency is guaranteed. The process 30 can include the next hop determination from the perspective of a master node to a slave node—here, the direction is always the same. In an embodiment, a master LSR can be an LSR with a lower (or higher) prefix SID and the slave LSR can be the other LSR (i.e., higher (or lower) prefix SID). Other approaches can be used, e.g., node ID, etc.

For example, assume the process 30 is finding a congruent shortest path between nodes X and Y. This requires two ECMP determinations, namely 1) when the current LSR is X and for a top label in the SR label stack of Y, and 2) when the current LSR is Y and for a top label in the SR label stack of X, here X and Y are prefix SIDs. In an embodiment, X is the master, and Y is the slave. Thus, for the two ECMP determinations, they are both calculated from the perspective of node X to node Y.

Note that Master→Slave determination guarantees that every LSR calculates the shortest path to all other LSRs in exactly the same manner, thus arriving at the same answer and thus achieving bidirectional congruency when Interior Gateway Protocol (IGP) is converged. During transitory short periods of time when IGP is not converged, then congruency may not be achieved.

Also, for ECMP paths, a path with recursively lowest (or highest) next LSR's prefix SID is chosen and next hop forwarding entry for it installed. What is meant by ECMP is 1) a set of paths with the lowest cost, and 2) if multiple such lowest cost paths exist in 1), then a subset of them with lowest hop count. Note that by this definition, ECMP paths will have the same number of hops.

The process 30 can include a deterministic selection mechanism. For example, assume 5 ECMP paths between nodes A and D as per the definition above:

| ECMP Path #1 | Node List |
|---|---|
| ECMP_1 | ALKFMD |
| ECMP_2 | ABCGND |
| ECMP_3 | ABCHPD |
| ECMP_4 | ABKIQD |
| ECMP_5 | ABCGRD |

In an example recursive determination, the ECMP paths are eliminated recursively to arrive at a selection. Here, the node list is traversed recursively with the lowest next LSR's SID chosen. Here, the chosen ECMP is ECMP_2 since recursively:

B < L, i.e., ECMP_1 is eliminated
C < K, i.e., ECMP_4 is eliminated
G < H, i.e., ECMP_3 is eliminated
N < R, i.e., ECMP_5 is eliminated The process 30 ensures prefix SID determinations are performed deterministically so that the same answer is arrived at in the forward direction as in the reverse direction, i.e., A to Z has the same result as Z to A. The proposal of Master/Slave and Recursive selection of the same ECMP by both LSRs for congruent bidirectional traffic flow between these two LSRs is just one way the required determinism can be solved Other ways are contemplated including using LSR loopback IPs or LSR IDs instead of prefix SIDs for Master/Slave determination, using GPS coordinates, or any other unique identifiers that can guarantee determinism.

Bottom line, if both LSRs are made to choose the same ECMP from among many best ECMPs, then congruent bidirectional traffic flow between these two LSRs can be achieved.

Next Hop Forwarding Determination Examples

FIGS. 6-11 are network diagrams of an SR network 50 with nodes 12 (labeled as A-K) for illustrating a next hop forwarding determination on each node (LSR). Specifically, FIGS. 6-11 include a bidirectional SR tunnel between the nodes 12A, 12D, and each FIG. evaluates the next hop determination from the perspective of different LSRs, specifically each FIG. represents a different node 12A, 12B, 12C, 12D, 12L, 12K in the SR network 50. For illustration purposes, this example selects the master based on the lower SID (e.g., A versus D) and selects ECMP paths recursively based on the lower SID as well. In FIGS. 6-11, each node 12 is analyzed in each FIG. separately. Specifically, in each FIG., a node 12 is selected as the LSR and the next hop forwarding determination is performed both to the node 12A and to the node 12D, i.e., in both directions. This example illustrates creation of a bidirectional SR tunnel 52 between the nodes 12A, 12D.

Figure 6:
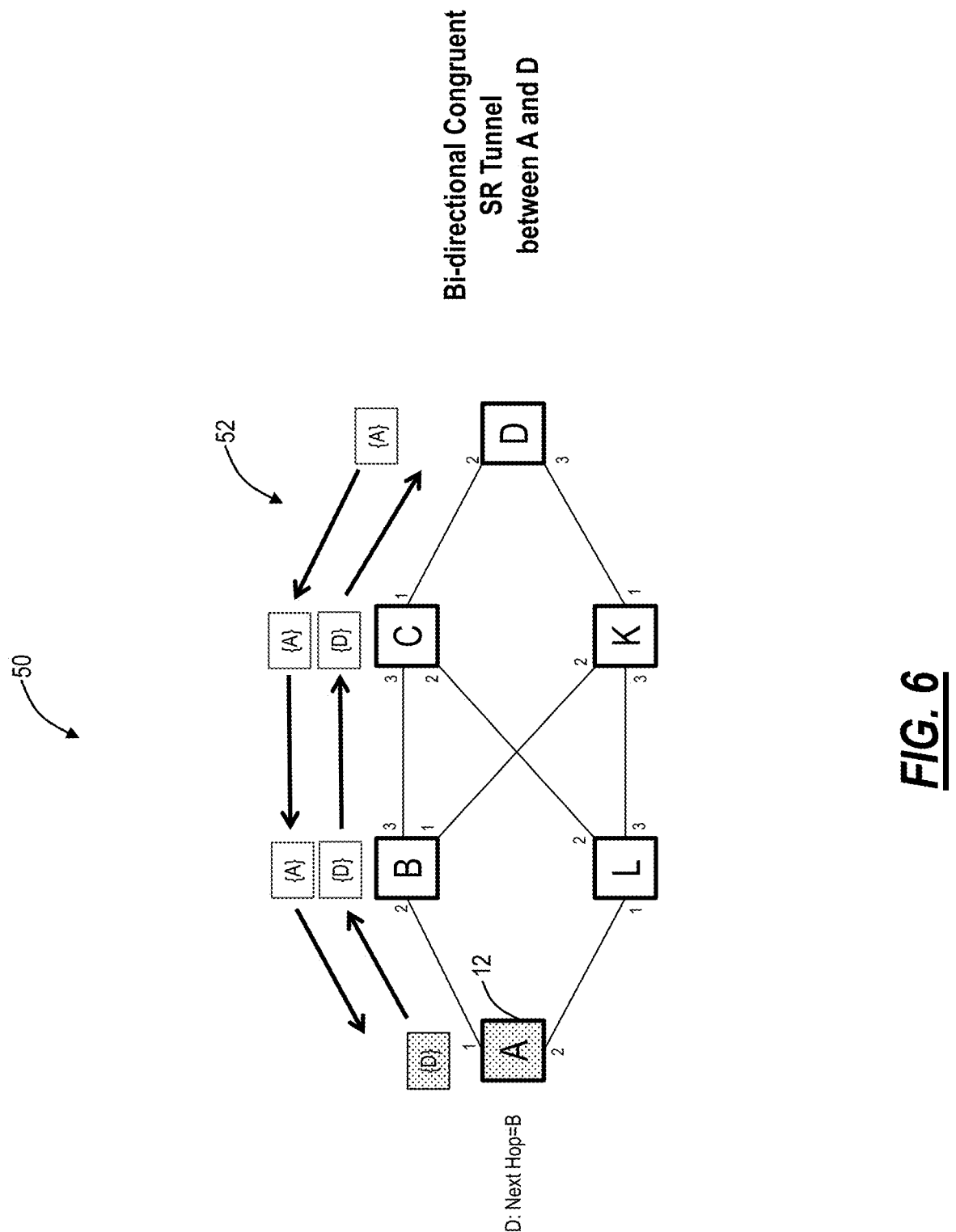
FIGS. 6-11 are network diagrams of an SR network with (labeled as A-K) for illustrating a next hop forwarding determination on each node (LSR).

FIG. 6 illustrates a next hop forwarding determination on the node 12A. Here, the current LSR is the node 12A, and for the shortest path from node 12A to 12D the top label is D. Here, A is the master, and D is the slave. There are 4 ECMP paths between the nodes 12A and 12D from master A's perspective, namely:

| |
|---|
| ECMP_1 = ALKD |
| ECMP_2 = ALCD |
| ECMP_3 = ABCD |
| ECMP_4 = ABKD |

Among the 4 ECMPs and from the perspective of node 12A: Since B<L and C<K then ECMP_3 is the chosen path and thus for traffic from the node 12A to 12D, next hop forwarding installed on the node 12A is A→B as per ECMP_3.

Figure 7:
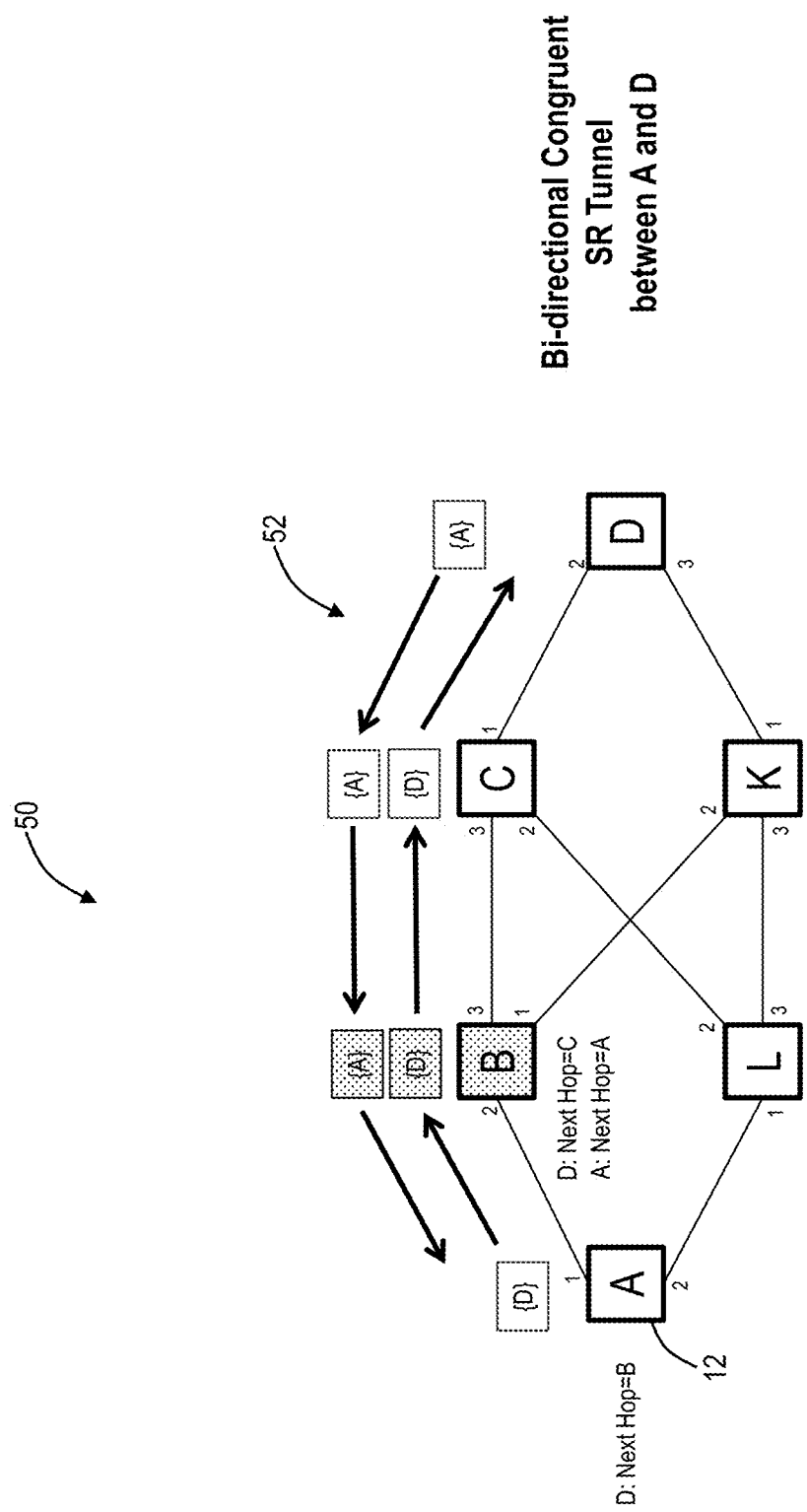

FIG. 7 illustrates a next hop forwarding determination on the node 12B. Here, the current LSR is the node 12B and for the shortest path from node 12B to 12D, i.e., for top label D, B is the master, and D is the slave. There are 2 ECMP paths between the nodes 12B and 12D from master B's perspective:

| |
|---|
| ECMP_1 = BCD |
| ECMP_2 = BKD |

Among the 2 ECMPs and from the perspective of node 12B: Since C<K then ECMP_1 is the chosen path and thus for traffic from the node 12B to 12D, next hop forwarding installed on the node 12B is B→C.

In the opposite direction, the current LSR is the node 12B, and for the shortest path from the node 12B to 12A, i.e., for top label A, A is the master, and B is the slave. There is a single best path between B and A from master A's perspective, namely Path=AB. Since there is only single best path then for traffic from the node 12B to 12A, next hop forwarding installed on the node 12B is B→A.

Figure 8:
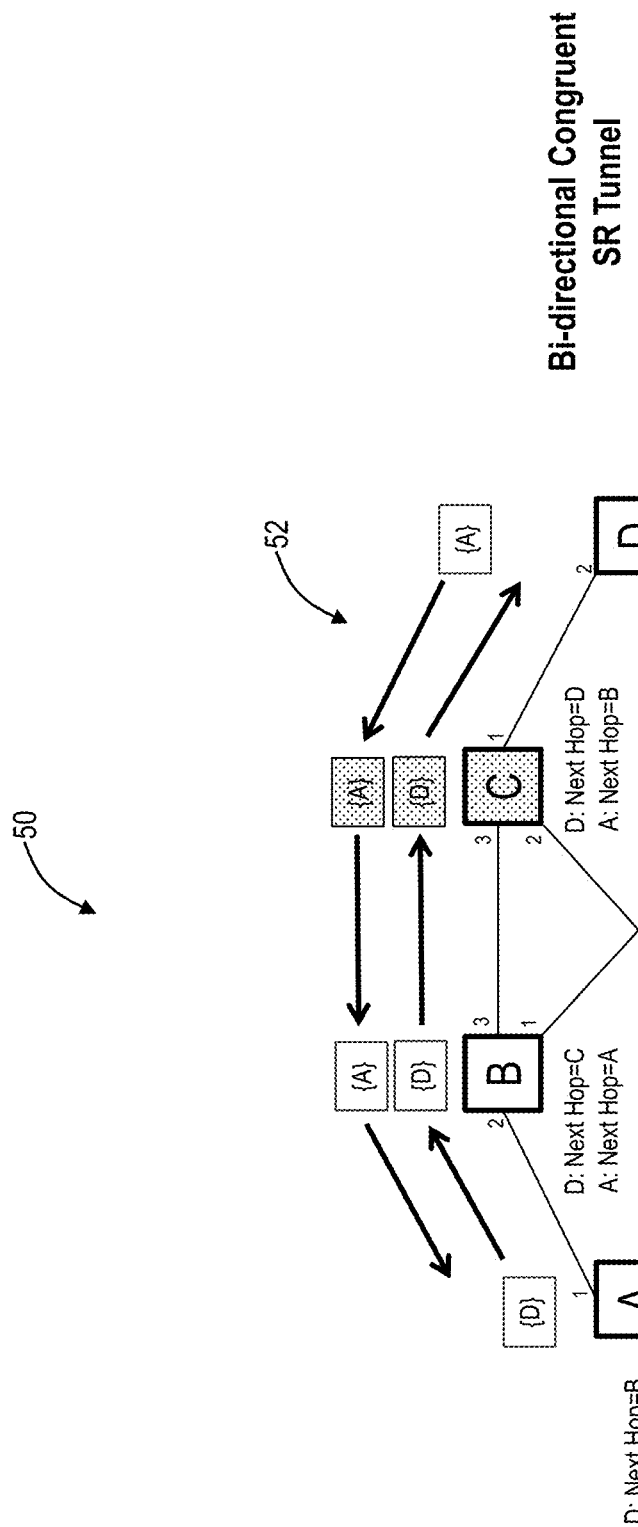

FIG. 8 illustrates a next hop forwarding determination on the node 12C. Here, the current LSR is the node 12C and for the shortest path from node 12C to 12D, i.e., for top label D, C is the master, and D is the slave. There is single best path between the nodes 12C and 12D from master C's perspective, namely Path=CD. Since there is only single best path then for traffic from the node 12C to 12D, next hop forwarding installed on the node 12C is C→D.

In the opposite direction, the current LSR is the node 12C and for the shortest path from the node 12C to 12A, i.e., for top label A, A is the master, and C is the slave. There are 2 ECMP paths between the nodes 12C and 12A from master A's perspective:

| |
|---|
| ECMP_1 = ABC |
| ECMP_2 = ALC |

Among the 2 ECMPs and from the perspective of node 12A: Since B<L then ECMP_1 is the chosen path and thus for traffic from the node 12C to 12A, next hop forwarding installed on the node 12C is C→B.

Figure 9:
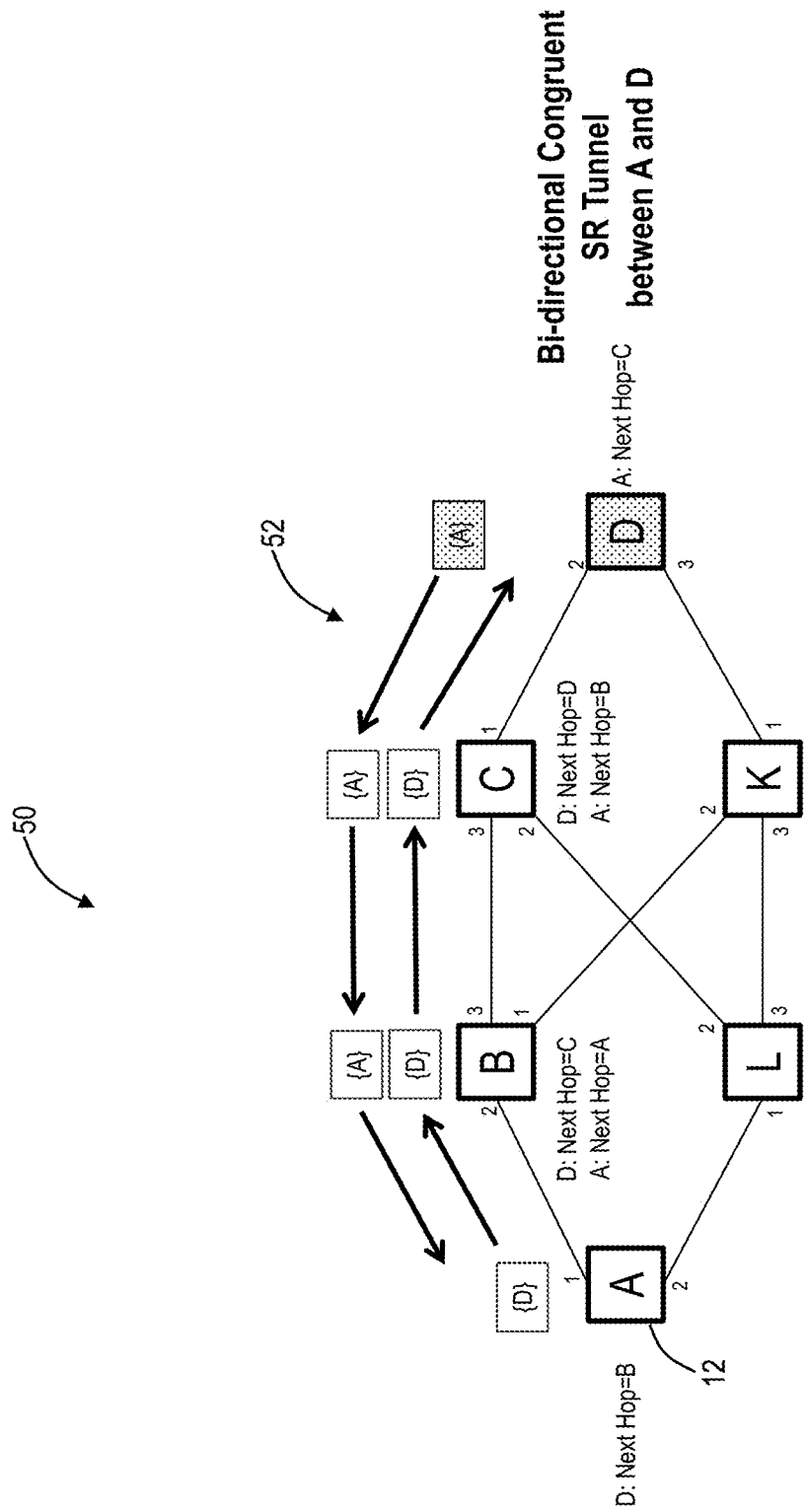

FIG. 9 illustrates a next hop forwarding determination on the node 12D. Here, the current LSR is the node D and for the shortest path from the node 12D to 12A, i.e., for top label A: A is the master, and D is the slave. There are 4 ECMP paths between the nodes 12D and 12A from master A's perspective:

| |
|---|
| ECMP_1 = ALKD |
| ECMP_2 = ALCD |
| ECMP_3 = ABCD |
| ECMP_4 = ABKD |

Among the 4 ECMPs and from the perspective of node 12A: Since B<L and C<K then ECMP_3 is the chosen path and thus for traffic from the node 12D to 12A, next hop forwarding installed on the node 12D is D→C.

Figure 10:
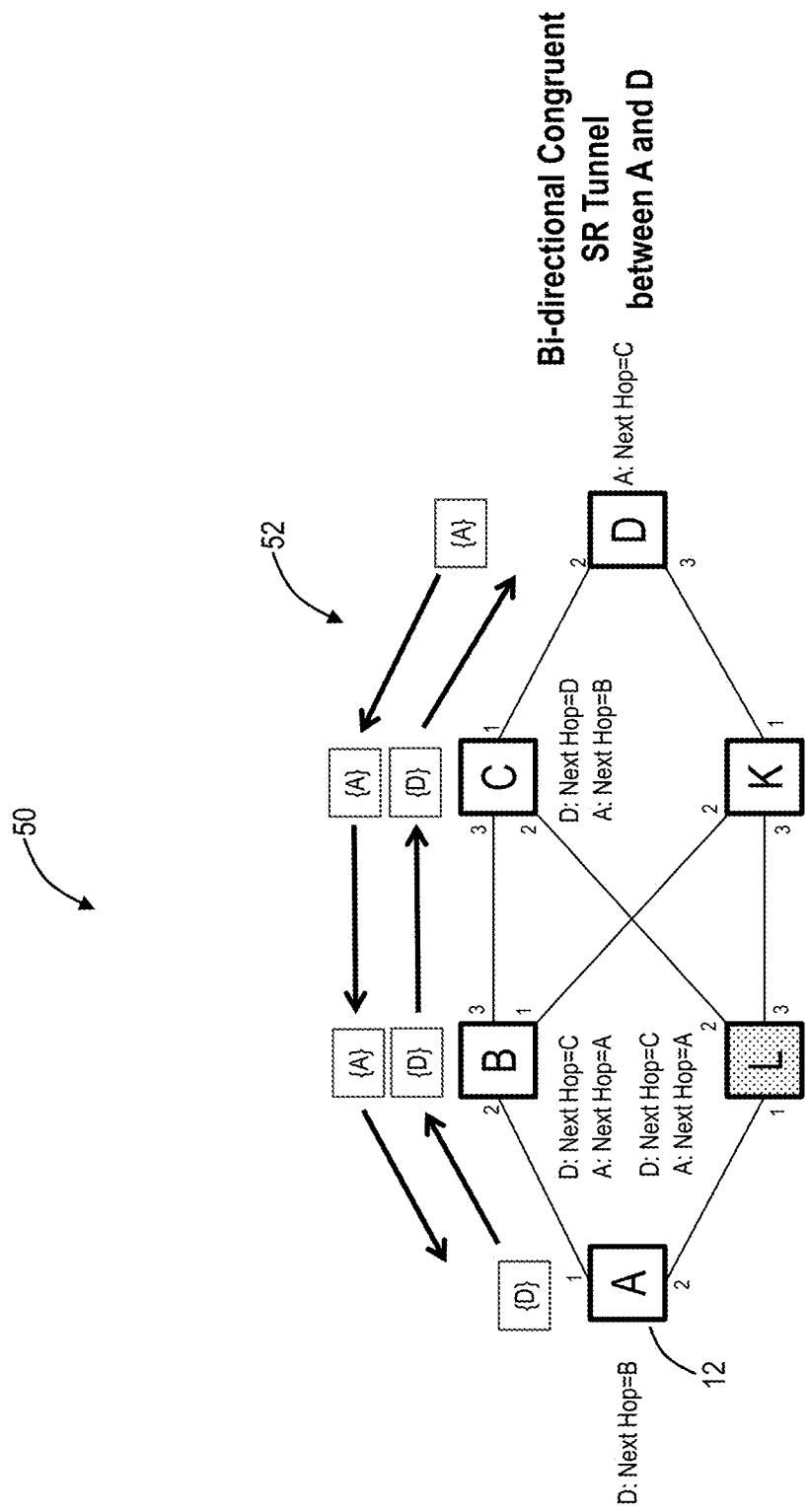

FIG. 10 illustrates a next hop forwarding determination on the node 12L. Here, the current LSR is the node 12L and for the shortest path from the node 12L to 12D, i.e. for top label D: D is the master, and L is the slave. There are 2 ECMP paths between the nodes 12L and 12D from master D's perspective:

| |
|---|
| ECMP_1 = DCL |
| ECMP_2 = DKL |

Among the 2 ECMPs and from the perspective of node 12D: Since C<K then ECMP_1 is the chosen path and thus for traffic from the node 12L to 12D, next hop forwarding installed on the node 12L is L→C.

In the opposite direction, the current LSR is the node 12L and for the shortest path from node 12L to 12A, i.e., for top label A: A is the master, and L is the slave. There is a single best path between the nodes 12L and 12A from master A's perspective: Path=AL. Since there is only a single best path then for traffic from the node 12L to 12A, next hop forwarding installed on the node 12L is L→A.

Figure 11:
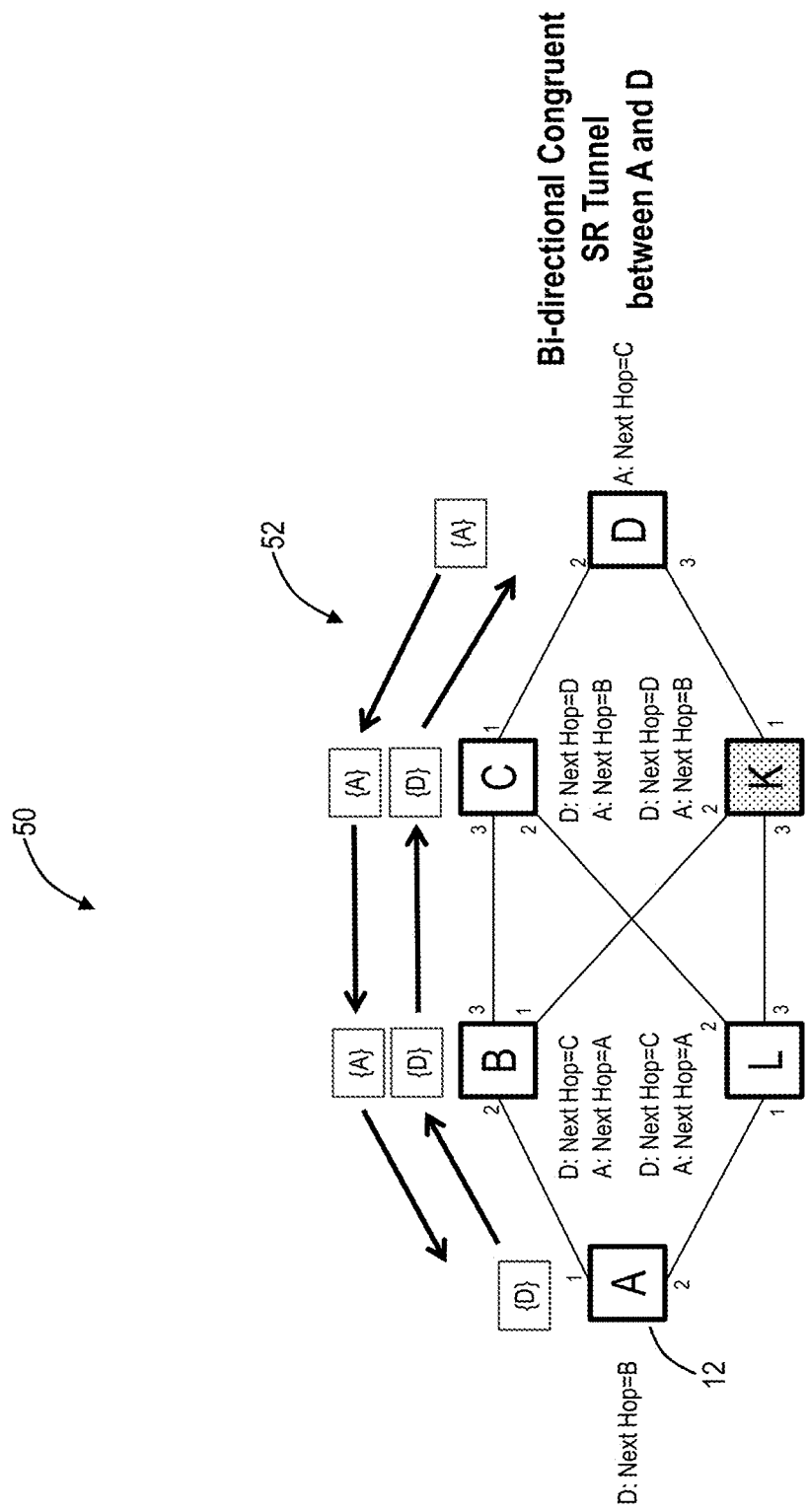
Figure 12:
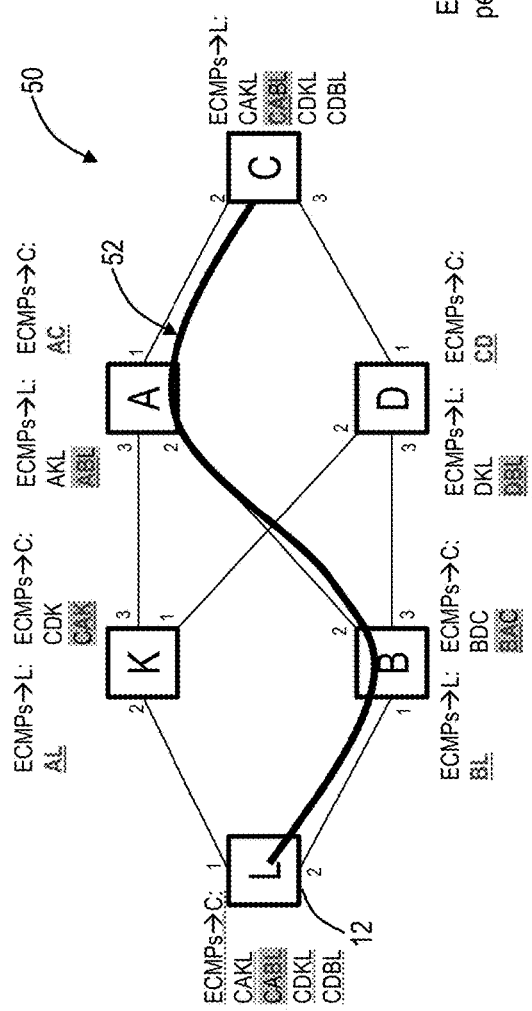
FIGS. 12-15 are network diagrams of the SR network of FIGS. 6-11 with the nodes having different prefix SIDs to illustrate the next hop forwarding determination based on the different prefix SID combinations.

FIG. 11 illustrates a next hop forwarding determination on the node 12K. Here, the current LSR is the node 12K and for the shortest path from the node 12K to 12D, i.e., for top label D: D is the master, and K is the slave. There is a single best path between the nodes 12K and 12D from master D's perspective: Path=DK. Since there is only a single best path then for traffic from the nodes 12K to 12D, next hop forwarding installed on the node 12K is K→D.

In the opposite direction, the current LSR is the node 12K and for the shortest path from the nodes 12K to 12A, i.e., for top label A: A is the master, and K is the slave. There are 2 ECMP paths between the nodes 12K and 12A from master A's perspective:

| |
|---|
| ECMP_1 = ABK |
| ECMP_2 = ALK |

Among the 2 ECMPs and from the perspective of node 12A: Since B<L then ECMP_1 is the chosen path and thus for traffic from the nodes 12K to 12A, next hop forwarding installed on the node 12K is K→B.

Figure 13:
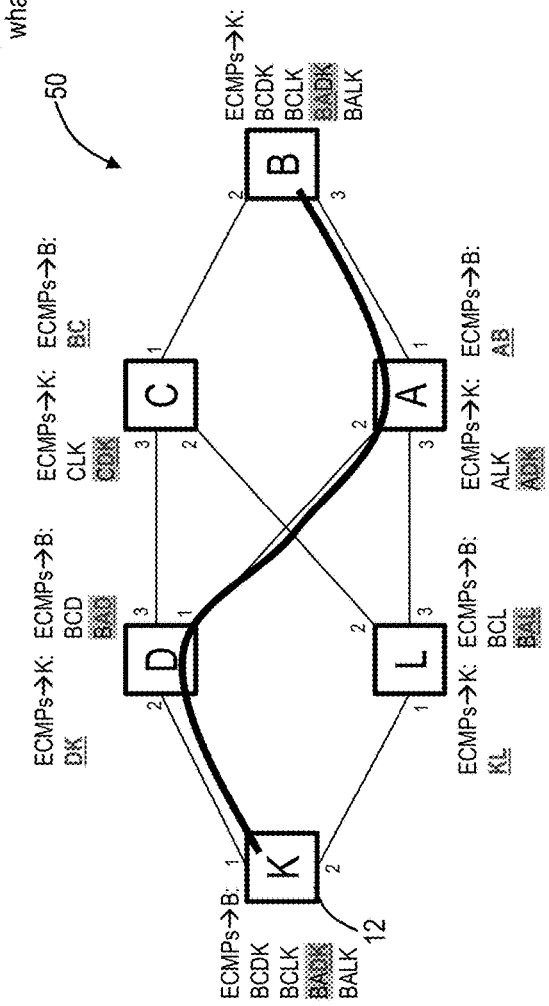
Figure 14:
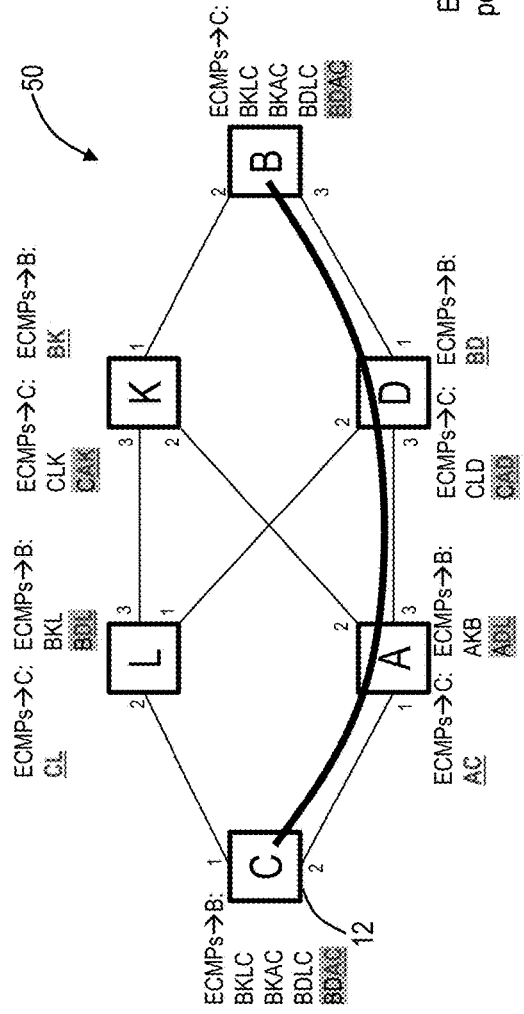
Figure 15:
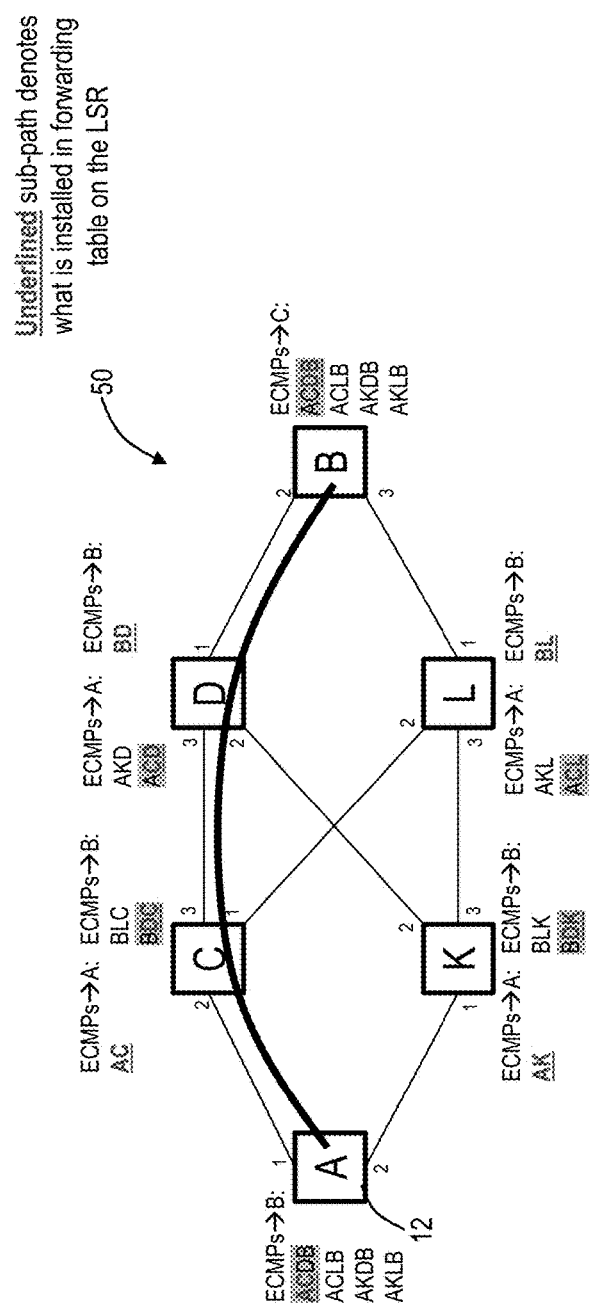

Next Hop Forwarding Determination Example for Different Prefix SID Combinations FIGS. 12-15 are network diagrams of the SR network 50 with the nodes 12 having different prefix SIDs to illustrate the next hop forwarding determination based on the different prefix SID combinations. For example, in FIG. 12, the bidirectional SR tunnel 52 is determined between the nodes 12L, 12C. In FIG. 13, the bidirectional SR tunnel 52 is determined between the nodes 12K, 12B. In FIG. 14, the bidirectional SR tunnel 52 is determined between the nodes 12C, 12B. In FIG. 15, the bidirectional SR tunnel 52 is determined between the nodes 12A, 12B. In each of FIGS. 12-15, the ECMP paths are shown at each node 12 in both directions (except at the LER nodes where the path is just shown in one direction, since the LER nodes are endpoints). The selected ECMP path is highlighted, and the subpath installed in the forwarding table at each LSR node is underlined.

Of note, the present disclosure relies on a deterministic path computation so that the forward and reverse directions of each tunnel in the bidirectional SR tunnel 52 arrive at the same path. In the examples of FIGS. 6-11 and 12-15, the deterministic path computation relies on selecting a master/slave based on a lower prefix SID and on determining the next hop recursively, amongst the multiple ECMP paths, based on the lower prefix SID. Other embodiments are contemplated. Also, the deterministic path computation does not need to be fixed networkwide for every tunnel 52. It only needs to be the same for a specific bidirectional SR tunnel 52. In an embodiment, the SR controller 16 can use different criteria to determine different tunnels to distribute flows better.

Efficient Next Hop Determination

Today's IGP SPF calculates a Shortest Path Tree (SPT) rooted at the LSR performing the calculation. The approach described herein continues to rely on such SPT calculation, i.e., SPT rooted at the LSR performing the calculation. The changes to ensure congruency include the root LSR—the same root LSR is chosen for both directions based on the master/slave logic, and how the path is chosen from among multiple ECMP paths in the SPT via the recursive selection. Both criteria ensure congruent paths are chosen for traffic between one LSR and another LSR.

Adjacency SID

Figure 16:
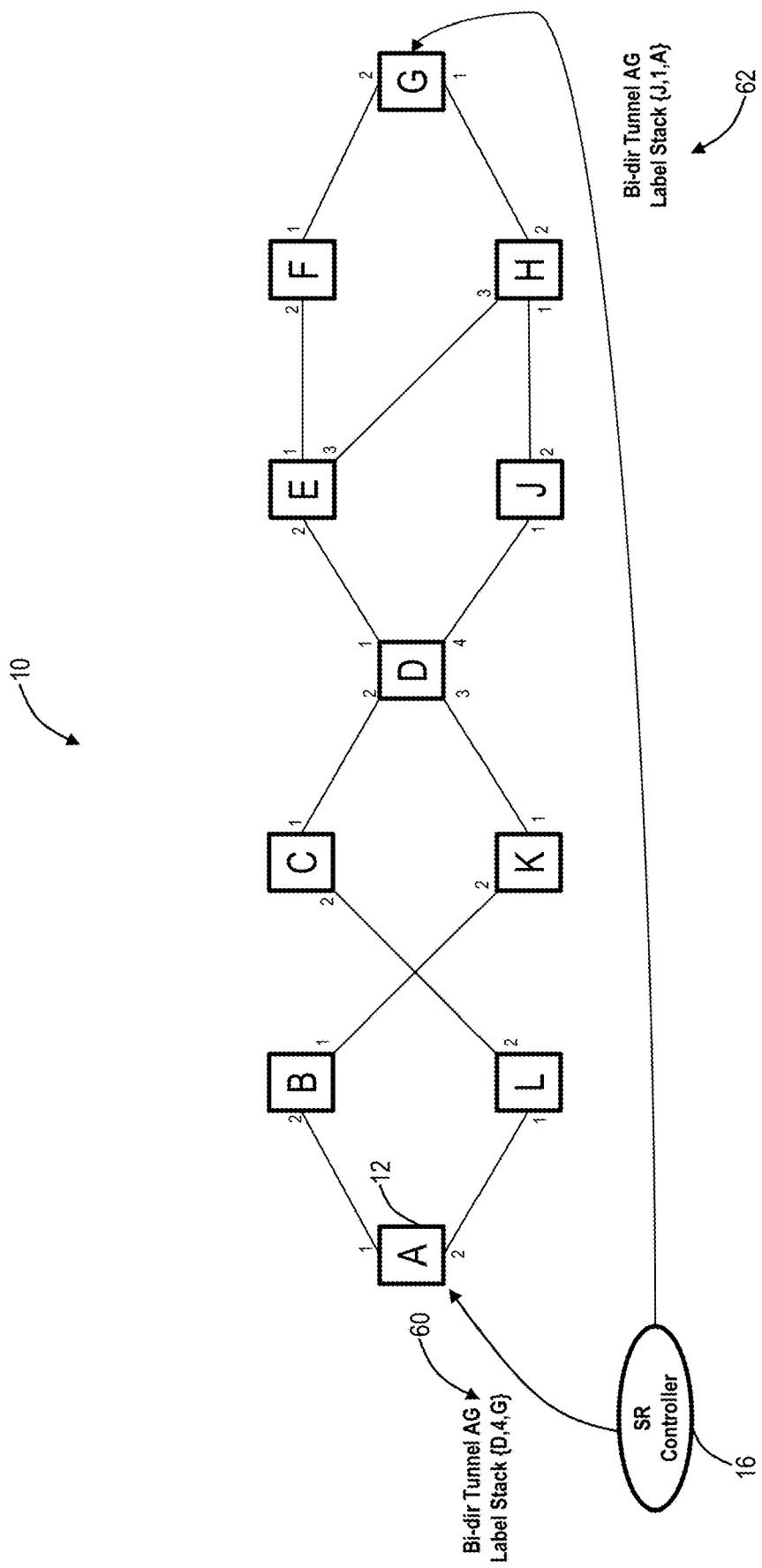
FIG. 16 is a network diagram of the SR network of FIG. 1 illustrating the approach for handling an adjacency SID in the inverting step in the process of FIG. 5.

FIG. 16 is a network diagram of the SR network 10 illustrating the approach for handling an adjacency SID in the inverting step in the process 30. Again, the step 34 includes inverting the label stack, of the first tunnel from A to Z, for the second tunnel, from Z to A. When there is an adjacency SID in the label stack, to invert, the SR controller 16 has to specify the adjacency SID on the neighboring LSR. In the example of FIG. 16, assume a label stack 60 for the first tunnel from the node 12A to 12G is {D, 4, G}. An inverted label stack 62 is {J, 1, A}. Here, the adjacency SID of 4 (on the node 12D) is inverted as a prefix SID of J with an adjacency SID of 1. That is, the inversion of an adjacency SID of 4 on node 12D is an adjacency SID of 1 on node 12J, which is the neighboring LSR.

Handling Parallel Links

When LSRs are interconnected by multiple parallel links of equal cost, the extended IGP SPF logic needs to choose the same link for forward and reverse traffic directions. Again, this can be done via a deterministic approach, such as by choosing the links with lowest (or highest) identifiers (e.g., unnumbered interfaces) or addresses (e.g., links with IP addresses).

Congruency SID

The discussion thus far has described how normal IGP SPF could be extended using the master/slave and recursive logic to attain bidirectional congruent traffic flows.

However, changing such SPF would also potentially change unidirectional traffic flows, and this may not be desirable, i.e., it may be desirable to preserve current SPF calculations for unidirectional traffic flows and only use the extended SPF calculations for bidirectional congruent traffic flows. As described herein, the extended SPF calculations utilize the master/slave and recursive logic.

In an embodiment, this can be accomplished by defining a new type of prefix SID, namely a congruency SID (or some other naming convention). That is, in addition to the existing prefix SID assigned to each LSR, each LSR will be assigned a new congruency SID. Thus, prefix SIDS will be used for unidirectional traffic flows, and congruency SIDS will be used for bidirectional congruent traffic flow. Note, the label space has enough space to support such an approach.

Figure 17:
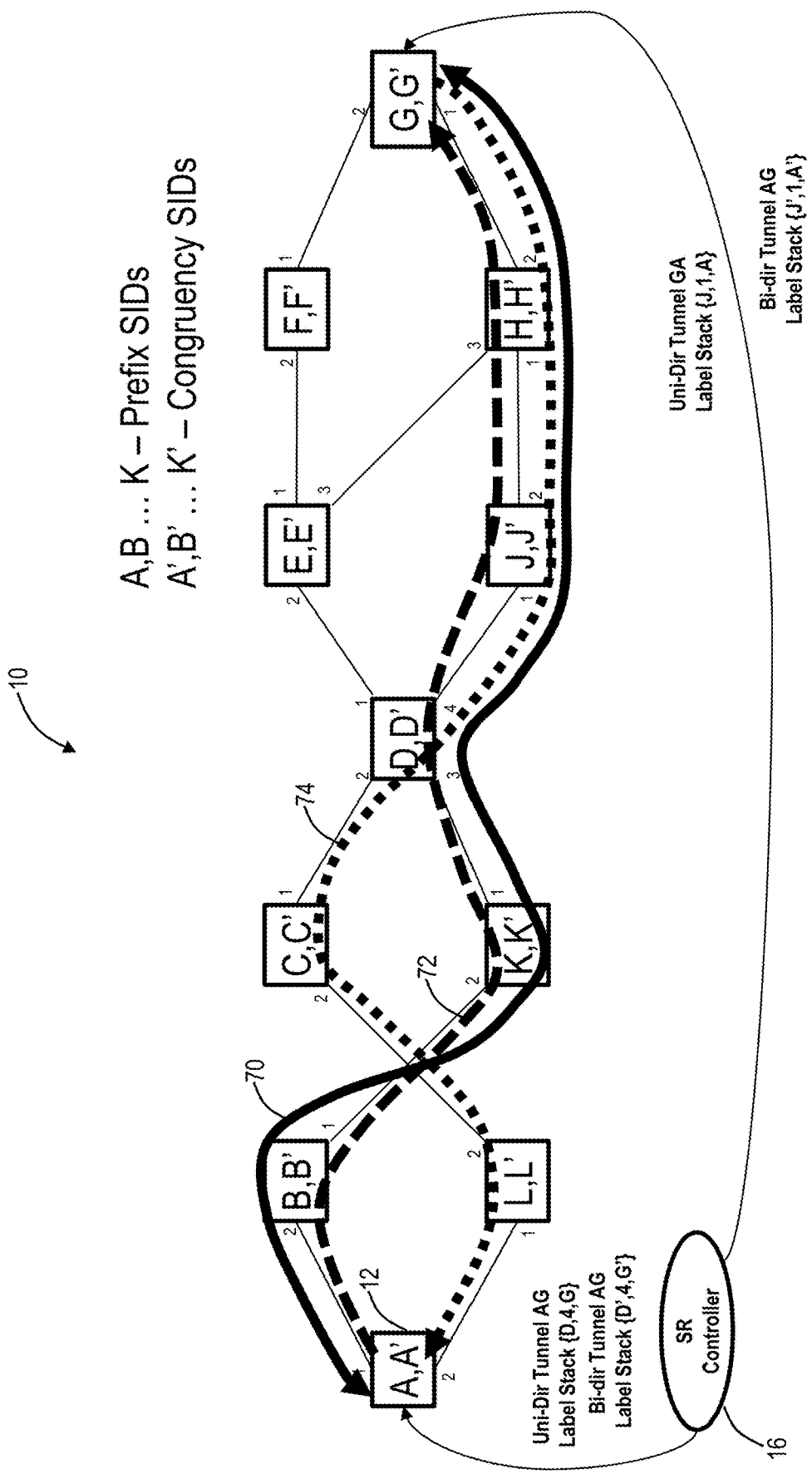
FIG. 17 is a network diagram of the SR network of FIGS. 1 and 16 illustrating use of a prefix SID and a separate congruency SID.

FIG. 17 is a network diagram of the SR network 10 illustrating the use of a prefix SID and a separate congruency SID. Here, each node 12 (labeled as A-G) has a prefix SID, e.g., A, B, C, etc., and another congruency SID which is referenced as a prime, e.g., A', B', C', etc. The congruency SID is similar to a prefix SID but denotes use in a bidirectional tunnel 70 where the master/slave and recursive logic is used.

The separate congruency SID leads to unidirectional tunnels 72, 74 potentially taking different paths to form the bidirectional tunnel. In this example, there are three tunnels 70, 72, 74, namely the bidirectional tunnel 70 (which is two unidirectional tunnels, but their congruency is guaranteed based on the process 30) and the unidirectional tunnels 72, 74. The bidirectional tunnel 70 is between the nodes 12A, 12G, the unidirectional tunnel 72 is from the node 12A to the node 12G, and the unidirectional tunnel 74 is from the node 12G to the node 12A.

The bidirectional tunnel 70 is determined as described herein and uses the congruency SIDs, namely a label stack of {D', 4, G'} from the node 12A to the node 12G and a label stack of {J', 1, A'} from the node 12G to the node 12A. Note, the congruency is guaranteed, and the forwarding determinations are all as described herein. The unidirectional tunnel 72 has a label stack of {D, 4, G} and the unidirectional tunnel 74 has a label stack {J, 1, A}. However, due to the use of the prefix SID instead of the congruency SID, the forwarding determinations are done as per normal, resulting in non-congruent tunnels, which is expected.

Example Node

FIG. 18 is a block diagram of an example implementation of a node 100, such as for the node 12 in the various SR networks 10, 50. Those of ordinary skill in the art will recognize FIG. 18 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the SR controller 16, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 18 is meant to provide a functional view, and those of ordinary skill in the art will recognize actual hardware implementations may vary.

Example Controller

Figure 19:
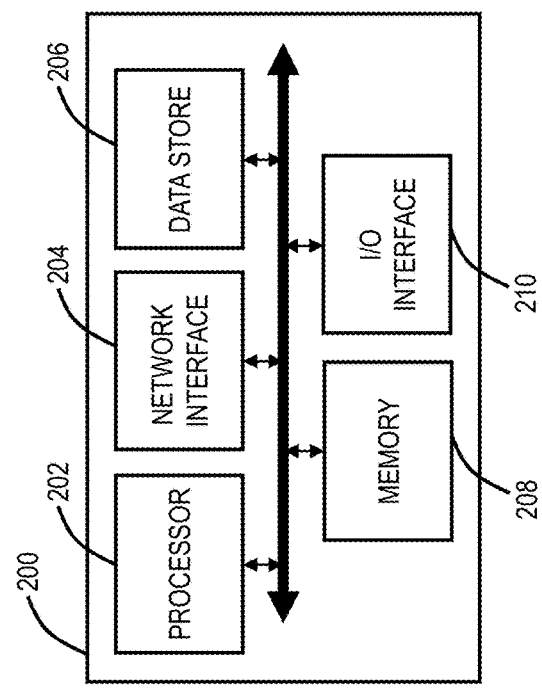
FIG. 19 is a block diagram of an example controller, which can form a control module for the node of FIG. 18, as well as the SR controller illustrated in the various SR networks described herein.

FIG. 19 is a block diagram of an example controller 200, which can form a control module 104 for the node, as well as the SR controller 16, or the like. The controller 200 can be part of the node 200, or a stand-alone device communicatively coupled to the node 200. Also, the controller 200 can be referred to in implementations as a control module, a shelf controller, a shelf processor, a system controller, etc.

The controller 200 can include a processor 202 which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Process

FIG. 20 is a flowchart of a process 300 for determining congruent bidirectional tunnels in SR. The process 300 can be implemented as a method, as a non-transitory computer-readable medium having instructions stored thereon for programming a device, in the SR controller 16, in one of the nodes 12, 100, and the like. Note, the process 300 is described with reference to a node 12, such as an LSR node in a SR network.

The process 300 includes obtaining one of a first label stack and a second label stack, wherein the first label stack is for a first tunnel from a first node A to a second node Z, wherein the first node A and the second node Z are two of a plurality of nodes in a Segment Routing (SR) network, and wherein the second label stack is for a second tunnel from the second node Z to the first node A (step 302); and determining next hop forwarding for a top label in the one of the first label stack and the second label stack in a deterministic manner so that the first tunnel and the second tunnel are congruent with one another (step 304). The first tunnel and the second tunnel are each a unidirectional SR tunnel, but are guaranteed to be congruent based on the deterministic manner, thereby collectively operating as a bidirectional SR tunnel. The first label stack and the second label stack can each include one or more of prefix Segment Identifiers (SIDs) and adjacency SIDs. The second label stack can be determined based on inverting the first label stack.

The deterministic manner can include the determination of next hop forwarding from a same perspective between a master node and a slave node in the second tunnel as in the first tunnel, where the same perspective guarantees each of the plurality of nodes calculates a shortest path in a same manner. The deterministic manner can include a recursive selection of one shortest path from a plurality of equal cost shortest paths. The first label stack and the second label stack can each include a prefix Segment Identifier (SID) that is defined as a congruency SID to denote a bidirectional congruent traffic flow.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a device to perform steps of:
  obtaining one of a first label stack and a second label stack, wherein the first label stack is for a first tunnel from a first node A to a second node Z, wherein the first node A and the second node Z are two of a plurality of nodes in a Segment Routing (SR) network, and wherein the second label stack is for a second tunnel from the second node Z to the first node A; and
  determining next hop forwarding for a top label in the one of the first label stack and the second label stack in a deterministic manner that guarantees both the first node A and the second node Z select a same shortest path from among multiple Equal Cost Multi Paths (ECMPs) so that the first tunnel and the second tunnel are congruent with one another, wherein the deterministic manner includes the determination of next hop forwarding, for prefix Segment Identifier (SID) forwarding, from a same direction between a master node and a slave node in the second tunnel as in the first tunnel.

2. The non-transitory computer-readable medium of claim 1, wherein the first tunnel and the second tunnel are each a unidirectional SR tunnel, but are guaranteed to be congruent based on the deterministic manner, thereby collectively operating as a bidirectional SR tunnel.

3. The non-transitory computer-readable medium of claim 1, wherein the first label stack and the second label stack each include one or more adjacency SIDs.

4. The non-transitory computer-readable medium of claim 1, wherein the second label stack is determined based on inverting the first label stack.

5. The non-transitory computer-readable medium of claim 1, wherein the deterministic manner includes a recursive selection of one shortest path from a plurality of equal cost shortest paths.

6. The non-transitory computer-readable medium of claim 1, wherein the first label stack and the second label stack each include a prefix Segment Identifier (SID) that is defined as a congruency SID to denote a bidirectional congruent traffic flow.

7. An apparatus comprising:
  a processor and memory storing instructions that, when executed, cause the processor to
    obtain one of a first label stack and a second label stack, wherein the first label stack is for a first tunnel from a first node A to a second node Z, wherein the first node A and the second node Z are two of a plurality of nodes in a Segment Routing (SR) network, and wherein the second label stack is for a second tunnel from the second node Z to the first node A; and
    determine next hop forwarding for a top label in the one of the first label stack and the second label stack in a deterministic manner that guarantees both the first node A and the second node Z select a same shortest path from among multiple Equal Cost Multi Paths (ECMPs) so that the first tunnel and the second tunnel are congruent with one another, wherein the deterministic manner includes the determination of next hop forwarding, for prefix Segment Identifier (SID) forwarding, from a same direction between a master node and a slave node in the second tunnel as in the first tunnel.

8. The apparatus of claim 7, wherein the first tunnel and the second tunnel are each a unidirectional SR tunnel, but are guaranteed to be congruent based on the deterministic manner, thereby collectively operating as a bidirectional SR tunnel.

9. The apparatus of claim 7, wherein the first label stack and the second label stack each include one or more adjacency SIDs.

10. The apparatus of claim 7, wherein the second label stack is determined based on inverting the first label stack.

11. The apparatus of claim 8, wherein the deterministic manner includes a recursive selection of one shortest path from a plurality of equal cost shortest paths.

12. The apparatus of claim 8, wherein the first label stack and the second label stack each include a prefix Segment Identifier (SID) that is defined as a congruency SID to denote a bidirectional congruent traffic flow.

13. A method comprising:
obtaining one of a first label stack and a second label stack, wherein the first label stack is for a first tunnel from a first node A to a second node Z, wherein the first node A and the second node Z are two of a plurality of nodes in a Segment Routing (SR) network, and wherein the second label stack is for a second tunnel from the second node Z to the first node A; and
determining next hop forwarding for a top label in the one of the first label stack and the second label stack in a deterministic manner that guarantees both the first node A and the second node Z select a same shortest path from among multiple Equal Cost Multi Paths (ECMPs) so that the first tunnel and the second tunnel are congruent with one another, wherein the deterministic manner includes the determination of next hop forwarding, for prefix Segment Identifier (SID) forwarding, from a same direction between a master node and a slave node in the second tunnel as in the first tunnel.

14. The method of claim 13, wherein the first tunnel and the second tunnel are each a unidirectional SR tunnel, but are guaranteed to be congruent based on the deterministic manner, thereby collectively operating as a bidirectional SR tunnel.

15. The method of claim 13, wherein the first label stack and the second label stack each include one or more adjacency SIDs.

16. The method of claim 13, wherein the first label stack and the second label stack each include a prefix Segment Identifier (SID) that is defined as a congruency SID to denote a bidirectional congruent traffic flow.

17. The method of claim 14, wherein the deterministic manner includes a recursive selection of one shortest path from a plurality of equal cost shortest paths.

* * * * *